July 5, 1960 A. G. GRANATH 2,943,726
DRIVE FOR MOLD CONVEYOR SYSTEMS
Filed Nov. 12, 1957 3 Sheets-Sheet 1
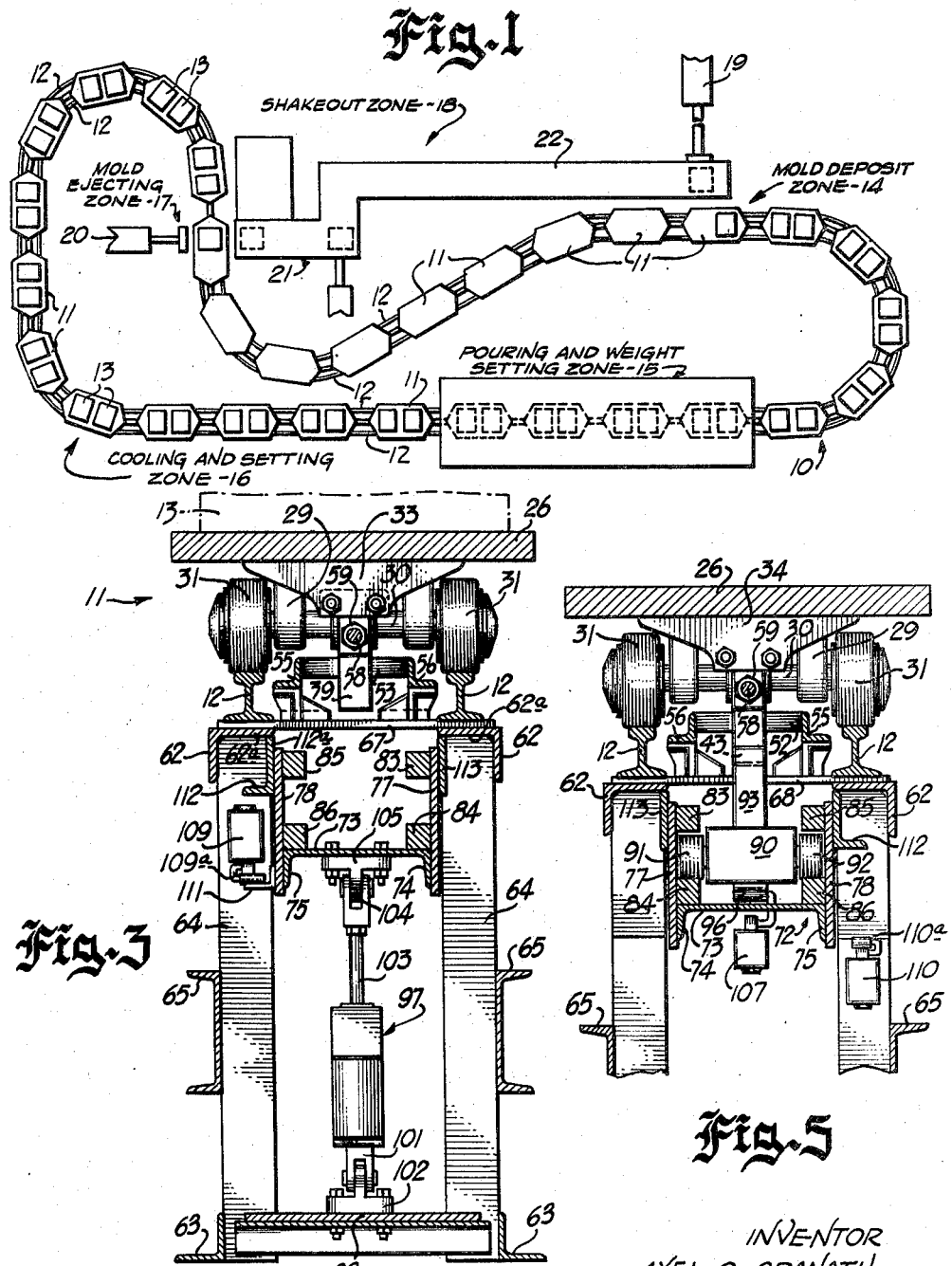
INVENTOR
AXEL G. GRANATH
by
Mason, Kolehmainen, Rathburn and Wyss
ATTORNEYS.

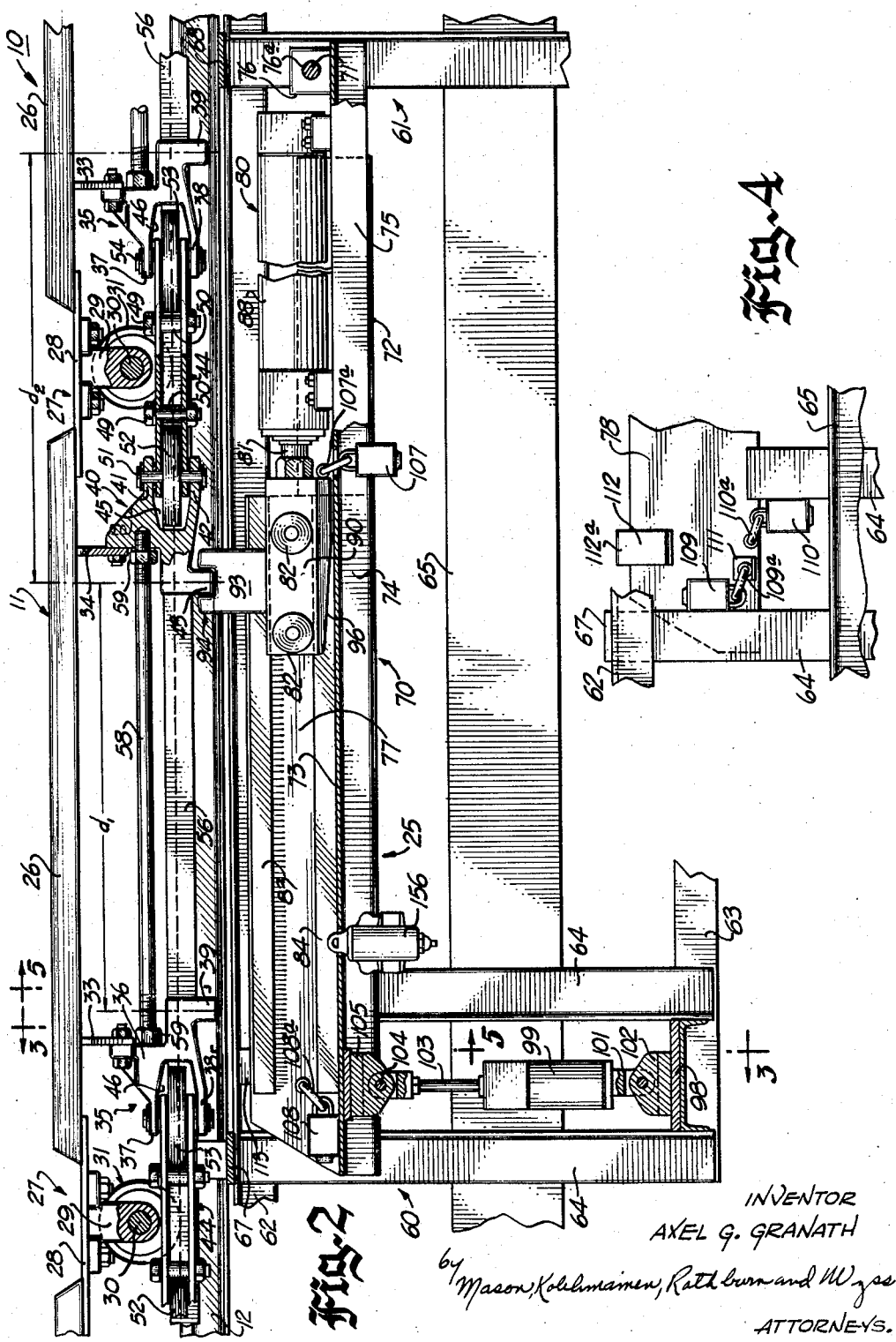

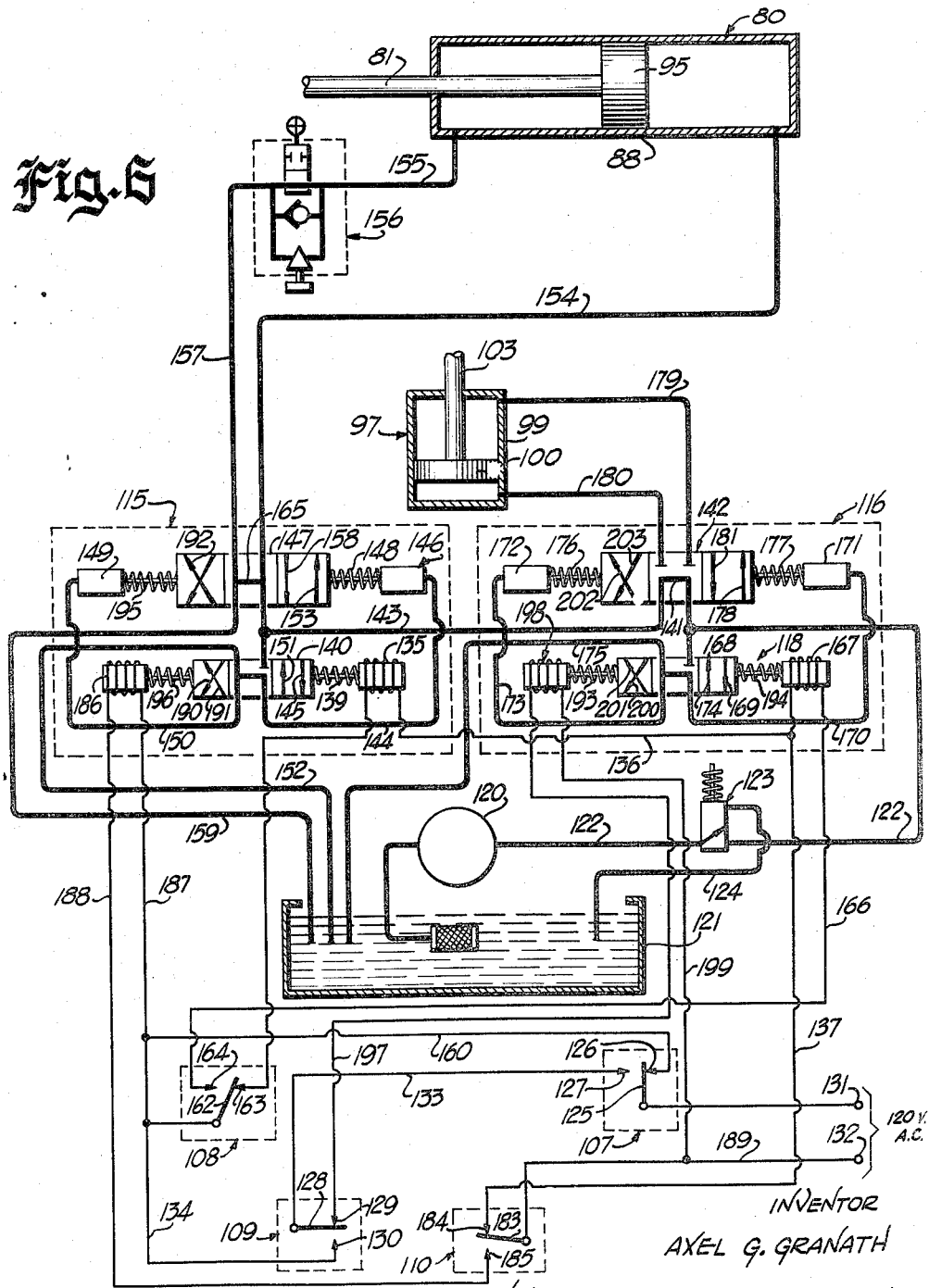

200
United States Patent Office 2,943,726
Patented July 5, 1960

2,943,726
DRIVE FOR MOLD CONVEYOR SYSTEMS

Axel G. Granath, Chicago, Ill., assignor to Herbert Simpson Corporation, Chicago, Ill., a corporation of Illinois Filed Nov. 12, 1957, Ser. No. 695,571

12 Claims. (Cl. 198—135)

This invention relates to a mold conveyor system and, more particularly, to a new and improved drive mechanism for advancing a mold conveyor train in step-by-step fashion along a path extending through a plurality of spaced apart operating zones or stations and for accurately positioning the conveyor train at each of said zones.

The invention has for its principal object the provision of a new and improved drive mechanism for advancing a mold conveyor train in step-by-step fashion.

Another object of the invention is to provide a step-by-step advancing mechanism which includes means for gradually decelerating the conveyor train near the completion of each advancing step in order to obviate adverse effects due to inertia of the train.

A further object of the present invention is to provide a drive mechanism of the above indicated character which also serves as an indexing arrangement for accurately positioning a mold conveyor at an operating station.

A still further object of the present invention is to provide a novel driving and indexing system which is particularly well suited for use in automatic molding systems wherein it is desirable precisely to position a mold conveyor at the various stations of the molding system.

Still another object of the present invention is to provide a combined driving and indexing mechanism which is operated automatically in response to the step-by-step advancement of the conveyor through the molding system.

It is also an object of the present invention to provide an improved drive mechanism for advancing a mold conveyor train in step-by-step fashion through the various operating zones with a smooth even movement in each of the steps so as to obviate shocks or strains upon the mold and at the same time to allow sufficient periods between the movement of the train from one operating zone to the next succeeding zone to permit the operators at each zone to perform their required operations.

In accordance with the present invention, the foregoing and other objects are realized by the provision of a hydraulically actuated pusher type drive mechanism which is selectively engageable with equally spaced drive receiving elements on a mold conveyor train and which, when actuated, functions to advance the entire train for a distance equal to the stroke of the pusher mechanism. At the completion of the advancing stroke, the pusher mechanism is automatically moved out of engagement with the train and is thereafter returned to its starting position in preparation for the next advancing stroke. At the starting position the pusher mechanism is again moved into engagement with the train so that its subsequent actuation effects the next succeeding step in the train movement. The advancement, disengagement, return and re-engagement of the pusher mechanism is automatically controlled in response to the movement of the pusher mechanism in order to insure efficient advancement of the train. Since the train is advanced in exactly equal steps and is moved only when engaged by the pusher mechanism, the individual cars of the train are precisely positioned or indexed at both the start and the completion of each of the advancing steps and, hence, these cars are accurately aligned or oriented at each of the operating zones or stations of the molding system.

Further objects and advantages of the present invention will become apparent from the following detailed description of an illustrative embodiment thereof taken in conjunction with the accompanying drawings wherein:

Fig. 1 is a diagrammatic, top plan view illustrating a simplified layout of a mold conveying system in which the driving and indexing mechanism of the present invention may be employed;

Fig. 2 is a fragmentary, front elevational view partly in section and illustrating a driving and indexing system characterized by the features of the present invention as employed in the advancement of a plurality of interconnected mold carrying cars;

Fig. 3 is a sectional view taken along a line substantially corresponding to the line 3—3 in Fig. 2, assuming, of course, that the entire mechanism is shown in the latter;

Fig. 4 is a fragmentary view illustrating particularly the limit switches actuated by the pusher mechanism when the latter is moved to its fully advanced position;

Fig. 5 is a fragmentary, sectional view taken along a line substantially corresponding to the line 5—5 in Fig. 2 assuming again that the latter shows the entire structure; and Fig. 6 is a schematic diagram illustrating a combined electrical and hydraulic control system for effecting the automatic operation of the driving and indexing mechanism in the manner indicated above.

Referring now to the drawings and more particularly to Fig. 1 thereof, a mold conveying system is there illustrated as comprising an endless string or train 10 of cars 11 movable along a pair of spaced apart, parallel tracks 12. Each of the cars 11 is adapted to carry a pair of molds 13 of conventional construction so that these molds are advanced from a mold deposit zone or station, indicated generally by the reference numeral 14 to a pouring and weight setting zone 15 through a cooling and setting zone 16 to a mold ejecting zone 17 where the molds are pushed from the cars to a shake-out zone 18. At the deposit zone 14 the mold flasks and their cores are deposited upon the cars 11 in any suitable manner, such, for example, as a push-on rod and cylinder assembly 19. The train is then advanced in step-by-step fashion in the manner to be described more fully hereinafter until the molds reach the station 15 where they are filled with molten metal to form the casting and where suitable weights are deposited upon the mold cope. The molten metal is cooled and hardened in the zone 16 as the conveyor cars are advanced from the pouring station 15 to the ejector zone 17. At the latter zone suitable ejecting mechanism which may take the form of a push-off rod and cylinder assembly 20 functions to remove the molds from the cars 11 to a conveyor mechanism which is indicated generally by the reference numeral 21 and which may take the form of a plurality of horizontally aligned rollers. In any event, each mold delivered to the conveyor 21 is stripped by removing its casting and separating its cope and drag. The mold is shaken out by means of a vibrating mechanism or the like at the shake-out zone 18 in order to remove the core material or sand so that the latter may be collected and reclaimed for further use. The drag and cope of the mold are then cleaned out in any suitable manner and are passed by conveyor mechanism 22 to the mold deposit zone 14 where the cope is united with the drag after the latter has received a fresh supply of core material. As previously indicated the mold flasks thus formed at the zone 14 are then deposited upon one of the cars 11 of the conveyor train by means of the pusher 19.

In view of the foregoing description it will be apparent that proper operation of the push-on rod and cylinder assembly 19 and of the push-off rod and cylinder assembly 20 requires a precise positioning of the cars 11 at the deposit zone 14 and at the ejecting zone 17. In addition, it is essential that the molds be precisely positioned at the pouring and weight setting zone 15 in order to facilitate formation of the castings. In accordance with the present invention, the precise positioning of the cars 11 at each of the described zones is effected by means of a step-by-step feeding mechanism illustrated in Figs. 2 and 5, inclusive, of the drawings, and indicated generally by the reference numeral 25. Before considering this mechanism in detail, however, attention is directed to Figs. 2, 3 and 5 for a description of the construction of the conveyor train 10. Each of the cars 11 making up the train 10 comprises a flat, horizontal tray or base portion 26 supported upon wheel assemblies 27 at each end of the tray. Each of the wheel assemblies 27 supports the adjacent ends of two of the trays 26 and, to this end, the wheel assembly includes a flat plate 28 carrying a bearing assembly 29 for rotatably journaling an axle 30. A pair of spaced apart wheels 31 mounted upon the axle 30 roll along the tracks 12 when the conveyor train 10 is moved.

Each of the trays 26 is also provided with a downwardly depending forward support arm 33 and a similar rear support arm 34 for a purpose which will become evident as the description proceeds. The forward support arm 33 has bolted or otherwise secured thereto a dogging assembly indicated generally by the reference numeral 35. The assembly 35 includes a casting or support member 36 having a pair of forwardly extending parallel fork arms 37 and 38 and a downwardly depending dog portion 39. The rear support arm 34 on each tray supports a dogging assembly 40 which is identical to the assembly 35 except that its fork arms 41 and 42 extend rearwardly to define a recess or opening 45 which faces and is horizontally aligned with a similar recess or opening 46 defined by the arms 37 and 38 of the assembly 35 on the succeeding car on the train. The dogging assembly 40 also includes a dogging portion 43 which is located forwardly of the rear support arm 34.

The assembly 40 at the rear of one car of the train and the assembly 35 at the forward end of the succeeding car are interconnected by means of a link arm 44 which functions to couple the adjacent cars of the train by providing a flexible joint to permit movement of the train over the tortuous path defined by the track 12. To this end, the link arm 44 comprises a pair of spaced apart, parallel arms 47 and 48 which are suitably joined together as, for example, by means of nut and bolt assemblies 49. An annular spacing ring 50 encircling the bolt of the assembly 49 is interposed between the plates 47 and 48 in order to maintain a fixed separation between these plates. The forward end portions of the plates 47 and 48 extend into the recess 45 in the assembly 40 and are provided with vertically aligned openings for accommodating a stub shaft 51 which also extends through aligned openings in the arms 41 and 42. A guide roller 52 is mounted upon the shaft 51 and is interposed between the plates 47 and 48. A similar guide roller 53 is mounted upon a shaft 54 journalled in the arms 37 and 38 of the assembly 35. As is best shown in Figs. 3 and 5 of the drawings, the rollers 52 and 53 are positioned between and are guided along, a pair of guard rails 55 and 56 in order to prevent lateral movement of the cars in the train 10 and to insure a smooth advance of the conveyor train along the rails 12.

A spacer rod 58 having its opposed ends respectively threaded into the assemblies 35 and 40 functions to maintain a fixed spacing between these assemblies and to lend rigidity to the structure. Lock nuts 59 on the spacer rod 58 may be employed to prevent the rod from turning to alter the desired spacing. By this arrangement, the dogs 39 and 43 supported on each of the trays are spaced apart by a distance indicated as $d_1$ in Fig. 2 and this distance is exactly equal to the spacing indicated as $d_2$, between the rear dog 43 on one car and the forward dog 39 on the next succeeding car of the train.

The tracks 12 and the guard rails 55 and 56 of the mold conveyor system are supported in elevated position above the floor of the foundry or the like upon a plurality of spaced apart track supporting frames, one of which is indicated generally by the reference numeral 60 in Fig. 2 and a second of which is indicated by the reference numeral 61. The supporting frame 60 includes a plurality of spaced vertical legs 64 anchored to the floor of the foundry. Pairs of upper and lower horizontal support beams respectively designated by the reference numerals 62 and 63 may be connected between the supporting frame 60 and the supporting frame 61 to increase the rigidity. An additional horizontal support beam 65 extending parallel but intermediate the beams 62 and 63 may also be provided between the frameworks 60 and 61. A base plate 67 resting upon horizontal legs 62a of the angle shaped beams 62 cooperates with a similar support plate 68 on succeeding frameworks to support the tracks 12 and the guard rails 55 and 56 (Figs. 3 and 5).

The step-by-step driving and indexing mechanism 25 referred to previously includes a pusher guide assembly 70 mounted for pivotal movement about a pin 71 on the framework 61. The pusher guide assembly 70 includes a somewhat channel-shaped base 72 having a flat center portion or web 73 and downwardly extending depending sides or flanges 74 and 75. A pivot lug 76 formed on the extreme rearward end of the base 72 is provided with a central opening 76a for accommodating the pin 71 in order to provide the pivotal connection referred to above for the assembly 70. The assembly 70 further includes side plates 77 and 78 respectively secured to the flanges 74 and 75 of the base. A fluid actuated piston and cylinder assembly 80 is bolted or otherwise secured to the web 73 of the base 72. When fluid is admitted to the right hand end of this cylinder as viewed in Fig. 2 the piston is moved toward the left to extend a pusher rod 81 which is suitably connected to a carriage 82. The connection between the rod 81 and the carriage 82 may be either a fixed connection or, alternatively, may comprise a pivot connection including a clevis and a connecting pin. In any event, the carriage 82 is adapted to be guided along the assembly 70 by means of a first pair of guide rails 83 and 84 secured to the side plate 77 and a second pair of guide rails 85 and 86 secured to the side plate 78. More specifically, the carriage 82 comprises a center body portion 90 having a pair of guide wheels 91 extending from one side thereof and fitting between the guide rails 83 and 84. A second pair of guide wheels 92 extending from the opposite side of the center body portion 90 rides between the guide rails 85 and 86. Thus, as the pusher rod 81 is extended the wheels 91 roll along the guide rail 84 while, at the same time, the wheels 92 roll along the guide rail 86 with upward movement of the carriage 82 out of engagement with the rails 84 and 86 being prevented by the guide rails 83 and 85. The bottom of the center body portion 90 is inclined or shaped as indicated at 96 in order to provide a camming portion which is adapted to engage a deceleration valve 156 to effect a gradual deceleration of the carriage 82 near the completion of the advancing stroke in a manner described more fully below. A latching member 93 protruding upwardly from the center body portion 90 is provided with a forked end 94 which is adapted to embrace one of the dogs 39 or 43 on the train in order to advance the train as the carriage 82 is moved along the assembly 70. Specifically, when fluid is admitted to a right hand end of the cylinder 88 of the assembly 80 as viewed in Figs. 2 and 6, the carriage 82 is moved along the assembly 70 to the left thereby advancing the train 10 along the tracks 12 for a distance equal to the stroke of the piston 95 shown in Fig. 6. The stroke of this piston is exactly equal to the spacing $d_1$ or $d_2$ between the dogs 39 and 43.

At the end of the advancing stroke the assembly 70 is adapted to pivot about the pin 71 in a counterclockwise direction as viewed in Fig. 2 in order to move the forked end 94 of the latching member 93 out of engagement with the dog of the train 10 and, hence, to permit the carriage 82 to be retracted along the assembly 70 while at the same time avoiding movement of the train 10 in a rearward direction. The described pivotal movement of the assembly 70 is effected by means of a piston and cylinder assembly 97 mounted for pivotal movement upon a base plate 98 secured at the bottom of the framework 60. The assembly 97, which includes a cylinder 99 and a piston 100 (Fig. 6), is provided with a bifurcated downwardly extending arm 101 which embraces a lug 102 secured to the base plate 98. A pivot pin cooperates with the arm 101 and the lug 102 to provide for pivotal movement of the assembly 97 upon the base plate. In similar manner a connecting rod 103 secured to the piston 100 is pivotally connected as is indicated by the reference numeral 104 to a lug 105 secured on the underside of the web 73 of the base 72. When fluid is admitted to the upper end of the cylinder 99 the piston 100 is lowered to disengage the latching member 93 from the dog on the train 10 and to pivot the assembly 70 in a counterclockwise direction so that it is inclined with respect to the horizontal. The rod 81 may then be retracted by admitting fluid to the left hand side of the piston 95 in order to draw the carriage 82 to the right as viewed in Fig. 2 along the assembly 70. At the end of the return stroke of the piston 95 fluid is admitted below the piston 100 so that the piston and cylinder assembly 87 is operated to the rod 103 and, hence, to pivot the assembly 70 in a clockwise direction in order to bring the forked end 94 of the latching member 93 into engagement with the next succeeding dog on the train 10 at which time one complete cycle of operation has been effected.

The described operation of the piston and cylinder assembly 80 and of the piston and cylinder assembly 97 is adapted to be controlled automatically by the movement of the carriage 82 and the pivotal movement of the assembly 70. Specifically, a limit switch 107 secured to the base 72 at a point near the forward end of the piston and cylinder assembly 80 cooperates with a second limit switch 108 secured on the upper face of the web 73 at the extreme left end of the assembly 70 and with third and fourth limit switches 109 and 110 secured to the framework 60 to effect the automatic operation. As is best shown in Figs. 3 and 4, an L-shaped operating member 111 to the side wall 78 is adapted to engage the operating arm 109a of the limit switch 109 in order to operate the latter switch. A second L-shaped bracket 112 secured on the side wall 78 is adapted to engage the arm 110a of the limit switch 110 in order to operate the latter switch. The bracket 112 includes a leg portion 112a extending upwardly beyond the side wall 78, which leg portion cooperates with an arm 113 secured to the side wall 77 to limit the upward movement of the assembly 70. More particularly, as is illustrated in Fig. 3 the extreme upper ends of the member 112a and 113 engage the underside of the horizontal legs 62a of the angle beams 62 to provide a stop for limiting the pivotal movement of the assembly 70 in a clockwise direction as viewed in Fig. 2.

Turning now to a consideration of the manner in which the four described limit switches effect the automatic control of the piston and cylinder assemblies 80 and 97 and referring particularly to Fig. 6, it will be observed that these limit switches are connected in an electrical circuit for controlling the operation of a pair of spring-centered fluid control valves 115 and 116. The valve 115 is referred to hereinafter as the advancement control valve since it controls the fluid flow to the piston and cylinder assembly 80 while the valve 116 is referred to as the elevation control valve because it controls the fluid flow to the piston and cylinder assembly 97. The operation of the control valves 115 and 116 is controlled by solenoid operated, spring centered valves 117 and 118, respectively. As illustrated in Fig. 6 these valves are adapted to control the flow of fluid under pressure from a pump 120 to the piston and cylinder assemblies 80 and 97. The pump 120 is adapted to draw fluid from a tank or reservoir 121 and to deliver pressurized fluid through a supply line 122 to the solenoid operated valves 117 and 118 which, in turn, selectively supply this fluid to the main control valves 115 and 116 of the system. A conventional pressure relief valve 123 may be provided in the line 122 for the purpose of diverting excess fluid from the pump 120 to the reservoir via return line 124.

The operation of the limit switches and the control valves to effect the automatic operation will best be appreciated by considering one full cycle of operation starting with the carriage 82 at the extreme right as viewed in Fig. 2 with the assembly 70 raised or pivoted in its extreme clockwise or horizontal position and with the latching member 93 on the carriage 82 in engagement with one of the dogs on the train 10, such for example, as the rearward dog 43 illustrated in Fig. 2. With the carriage 82 at the extreme right, the operating arm 107a of the limit switch 107 is pivoted in a clockwise direction as viewed in Fig. 2 so that the switch 107 is operated and with the assembly 70 in its fully raised position the bracket 111 engages the arm 109a of the limit switch 109 in order to pivot this arm in a counterclockwise direction as viewed in Fig. 4, thereby to operate the switch 109. The limit switches 107, 108, 109 and 110 are shown in Fig. 6 in their normal or de-energized conditions and, hence, when the carriage is at the right and the assembly 70 is raised at the start of the cycle, the switches 107 and 109 are energized so that the movable arm 125 of switch 107 is disengaged from the contact 126 and is moved into engagement with contact 127. At the same time, movable arm 128 of switch 109 is disengaged from contact 129 and is moved into engagement with contact 130. A circuit is thus completed from terminal 131 at one side of a suitable alternating current source, through contact 127 of switch 107, through conductor 133, through contact 130 of switch 109, through conductor 134, through the closed contacts of switch 108 to a solenoid 135 of the valve 117, through conductors 136 and 137 and through the closed contacts of switch 110 to the opposite terminal 132 of the alternating current source. The solenoid 135 is, of course, energized so that its arm 139 functions to move valve piston 140 to the left as viewed in Fig. 6. At this time, of course, the elevation control valve 116 and its associated solenoid operated valve 118 are in their center positions illustrated in Fig. 6 so that the fluid from supply line 122 passes through passage 141 in the center region of main control piston 142 to fluid supply line 143. When the piston 140 is moved to the left by energization of the solenoid 135, the line 143 is connected to a fluid supply line 144 through a fluid controlling passage 145 in the right hand section of the piston 140. The fluid in the line 144 is passed to an operating piston and cylinder 146 which functions to move main control piston 147 of the advancement control valve 115 to the left and to compress centering spring 148. Movement of the piston 147 to the left forces exhaust fluid from a second piston and cylinder 149 through fluid line 150, through passage 151 in the right hand section of the piston 140 and through exhaust line 152 to the tank 121. Movement of the main control piston 147 to the left also connects the line 143 through a fluid passage 153 to fluid conduit 154 thereby supplying fluid under pressure to the right hand side of the piston 95. The piston 95 is thus moved toward the left as viewed in Figs. 2 and 6 in order to extend the rod 81 and move the carriage 82 along the assembly 70 and, hence, to advance the train 10 in the manner previously described. To permit the described movement of the piston 95, the left hand side of the cylinder 88 is connected through fluid conduit 155, through an automatically operated deceleration valve 156 mounted on the assembly 70 and described more fully below, through conduit 157, through a passage 158 in the right hand section of the main control piston 147 to fluid exhaust line 159 which is connected to the sump 121. As the carriage 82 is moved from the extreme right position the arm 107a of the limit switch 107 is returned by means of a biasing spring (not shown) to its normal position illustrated in Fig. 6. However, the return of the switch 107 to normal position has no effect on the operation since the circuit to the solenoid 135 continues to be completed through contact 126 and conductor 160 and through the closed contacts of the switch 108.

The piston 95 continues its movement toward the left until as it nears the completion of its stroke the camming portion 96 of the carriage engages the deceleration switch 156. The switch 156 is of conventional construction and functions to provide a variable fluid flow between the lines 155 and 157. Specifically, as the camming surface 96 moves over the valve 156 during movement of carriage 82 to the left, the flow from line 155 to 157 is gradually restricted so that fluid is exhausted from the left hand side of the cylinder 88 at a gradually decreasing rate. The described restriction of the outlet from the left hand side of the cylinder 88, of course, functions to slow down or decelerate the piston movement, thus, at the same time decelerating the carriage 82 and bringing the train 10 to a gradual stop. This deceleration, of course, prevents the inertia of the train from carrying the train forwardly at the completion of the advancing stroke of the piston 95.

When the carriage 82 reaches its extreme left position as viewed in Fig. 2 is engages the operating arm 108a of the limit switch 108 thus moving the arm 162 of the latter switch out of engagement with contact 163 and into engagement with contact 164. When the arm 162 is disengaged from contact 163 the energizing circuit for the solenoid 135 is broken with the result that both the solenoid operated valve 117 and the advancement control valve 115 are returned to their neutral positions illustrated in Fig. 6 by their centering springs 139 and 148. In its neutral position, piston 147 functions to connect the fluid lines 154 and 157 leading to the piston and cylinder assembly 80 together through central passage 165. This same passage connects the line 143 to the fluid exhaust line 159 and as a result the assembly 80 remains quiescent following the completion of the advancing stroke of the piston 95.

In addition, operation of the limit switch 108 completes a circuit from terminal 131, through contact 126, through conductor 160, through contact 164, through conductor 166, through solenoid 167, through conductor 137, through the closed contacts of limit switch 110 and through conductor 189 to the terminal 132. When the described circuit is completed, solenoid 167 is energized to move piston 168 of the solenoid operated valve 118 to the left, thus connecting fluid supply line 122 through fluid passage 169 in the right hand section of the piston 168 to fluid line 170. The fluid line 170 delivers pressurized fluid to a piston and cylinder assembly 171 at the right hand side of the piston 142 of the elevation control valve 116. The assembly 171 functions to move the main control piston 142 to the left thereby forcing fluid from a piston and cylinder assembly 172 at the left hand side of the main control valve 142 through line 173 and through passage 174 in the right hand section of piston 168 to an exhaust line 175 which is connected to the sump 121. Movement of the piston 142 to the left connects the supply line 122 through a fluid passage 178 in the right hand section of the piston 142 to a fluid conduit 179 which functions to deliver fluid to the upper end of the cylinder 99 in order to move the piston 100 downwardly. Exhaust fluid from the lower portions of the cylinder 99 passes through conduit 180 and through passage 181 in the right hand section of the piston 142 to the line 143 which, as previously indicated, is connected through passage 165 to exhaust line 159. Thus, under the described conditions, the upper end of the piston 100 is subjected to fluid under pressure from line 179 and the lower end of the piston 100 is connected to sump so that the piston begins to move downwardly within the cylinder 99. As the piston 100 is lowered, the assembly 70 is pivoted about the pin 71 in a counterclockwise direction as viewed in Fig. 2 and the latching member 93 is moved out of engagement with the dog 43. When the assembly 70 moved downwardly the bracket 111 is disengaged from the operating arm 109a of the limit switch 109 and, as a result, the latter switch is no longer actuated and its arm 128 is urged by a biasing spring (not shown) into engagement with the contact 129. De-energization of the switch 109 has no effect on the operation, however, since the circuit to the solenoid 167 continues to be completed through contact 126 through conductor 160, through contact 164 and through conductor 166. Thus, as the assembly 70 contines to descend only the limit switch 108 is actuated, the remaining switches being in their normal de-energized positions.

When the piston 100 completes its downward stroke the bracket 112 contacts the arm 110a of the limit switch 110, thereby moving arm 183 out of engagement with contact 184 and into engagement with contact 185. The described operation of switch 110 breaks the energizing circuit to the solenoid 167 and completes a circuit for energizing solenoid 186 of the advancement control valve 115. Interruption of the energizing circuit for solenoid 167 permits pistons 142 and 168 to return to their neutral or center positions under the influence of their centering springs 177 and 194. The circuit for energizing the solenoid 186 extends from terminal 131 through the contact 126, through conductor 160, through conductor 187, through solenoid 186, through conductor 188, through contact 185 and through conductor 189 to the terminal 132. When solenoid 186 is energized, the flow control piston 180 is moved from its neutral position to the right with the result that fluid supply line 143, which is now connected to line 122 through the passage 141 in the piston 142, delivers fluid through fluid passage 190 in the left hand section of the piston 140 to fluid line 150. The fluid line 150, in turn, delivers fluid under pressure to piston and cylinder assembly 149 in order to move the advancement control piston 147 to the right. Movement of the piston 147 to the right causes the piston and cylinder assembly 146 to force exhaust fluid through the line 144 and through fluid passage 191 in the left hand section of the piston 140 to exhaust line 152. Movement of the piston 147 to the right also connects the fluid line 143 through passage 192 in the left hand section of the piston 147 to conduit 157 which is connected through the valve 156 and through conduit 155 to the left hand side of piston 95. The valve 156 is constructed to permit relatively free flow of fluid in the reverse direction, that is, in a direction extending from the fluid line 157 to the conduit 155, and, as a result, the piston 95 begins to move toward the right to retract the rod 81 and to move the carriage 82 along the assembly 70 toward the right as viewed in Fig. 2. At this time, the piston 142 of the elevation control valve 116 is in its neutral position so that the fluid lines 179 and 180 are both blocked and, as a result, the piston 100 remains in its fully descended position and the assembly 70 remains in its inclined or full counterclockwise position.

As the carriage 82 leaves its left hand position it moves out of engagement with the arm 108a of the limit switch 108 and, as a consequence, the latter switch returns to its normal position, but this has no effect on the operation since the solenoid 186 continues to be energized through the circuit previously described. The carriage 82 continues its movement toward the right along the assembly 70 until it engages the operating arm 107a of the limit switch 107 at which time the movable arm 125 moves out of engagement with contact 126 and into engagement with contact 127. The described operation of the switch 107 breaks the energizing circuit to the solenoid 186 with the result that the pistons 140 and 147 return to their neutral positions under the influence of the centering springs 195 and 196. With the assembly 70 in its lower position and the carriage 82 at the right the switches 107 and 110 are both actuated. A circuit is thus completed from terminal 131 through contact 127, through conductor 133, through contact 129, through conductor 197, through solenoid 198 and through conductors 199 and 189 to the terminal 132. The described circuit is, of course, effective to energize the solenoid 198 in order to move the piston 168 to the right. The described movement of the piston 168 connects fluid supply line 122 through passage 200 in the left hand section of the piston 168 to fluid line 173 in order to supply fluid to the piston and cylinder assembly 172 and, hence, to move the elevation control piston 142 to the right. Movement of the piston 142 to the right forces fluid from the piston and cylinder assembly 171 through fluid line 170 and through fluid passage 201 in the left hand section of the piston 168 to exhaust line 175. Movement of the piston 142 to the right also connects fluid supply line 122 through passage 202 to conduit 180 and, at the same time, connects conduit 179 through fluid passage 203 to fluid line 143 which, with the advancement control valve 115 in its center or neutral position, is connected through passage 165 to exhaust line 159. Thus, when the piston 142 is moved to the right the lower end of the cylinder 99 receives fluid under pressure from conduit 180 while the upper end of the cylinder 99 is connected to exhaust with the result that the piston 100 moves upwardly within the cylinder 99 to extend the rod 103 and, hence, to pivot the assembly 70 about the pin 71 in a clockwise direction as viewed in Fig. 2.

As the assembly leaves its lower position, the bracket 112 moves out of engagement with the operating arm 110a of the limit switch 110 and the latter switch returns to its normally deenergized position with the movable arm 183 in engagement with contact 184. The latter operation of the switch 110 does not affect the energizing circuit for the solenoid 198 and, as a result, the piston 100 continues its upward movement. When the piston 100 has completed its upward stroke the members 112a and 113 on the assembly 70 engage the underside of the legs 62a of the angle braces 62 to limit the clockwise movement of the assembly 70. At this time the bracket 111 engages the arm 109a of the limit switch 109 to move the arm 128 into engagement with contact 130. The operation of switch 109 breaks the circuit to solenoid 198 so that pistons 142 and 168 are returned to neutral position by centering springs 176 and 193. Both of the valves 115 and 116 are thus in neutral condition, the assembly 70 is raised and the carriage 82 is moved to the extreme right.

When the assembly 70 is raised the forked portion 94 of the latching member 93 is positioned to embrace the dog 39 at the forward end of the next succeeding car 11 in the train and one cycle of operation has been completed. The cyclic operation of the drive mechanism 25 continues so that the train 10 is advanced for a distance equal to the spacing between the dogs 39 and 43, that is, for a distance indicated by $d_1$ or $d_2$ in Fig. 2 for each cycle of operation. The rate of acceleration and deceleration of the train is controlled by the rate of flow of fluid controlling the movement of the piston 95. As previously mentioned, the spacing between the forward dog 39 and the rearward dog 43 on each car is exactly equal to the spacing between the rear dog 43 and the forward dog 39 of the next succeeding car and is also equal to the stroke of the piston 95 so that each dog is properly positioned at the beginning of each cycle to be engaged by the forked end 94 of the latching member 93. At the beginning and at the end of each cycle the train 10 is accurately indexed so that the molds carried on the trays 26 are precisely positioned at each zone in order to facilitate the required operations taking place at the different zones. Thus, it will be observed from the foregoing description that the enumerated objects and advantages of the present invention are achieved by the construction illustrated in the drawings.

While a particular embodiment of the invention has been shown and described it will be recognized that many modifications will readily occur to those skilled in this art and it is therefore contemplated by the appended claims to cover any such modifications as fall within the true spirit and scope of the present invention.

What is claimed as new and desired to be secured by Letters Patent of the United States is:

1. In combination, a mold conveying train having a series of equally spaced drive receiving elements thereon and drive means for advancing said train in step-by-step fashion by successively engaging said elements, said drive means comprising a guide structure extending beneath and generally parallel to the path of movement of the train, a mechanism engageable with said drive receiving elements and movable along said guide structure, a first piston and cylinder assembly mounted on said guide structure for advancing and retracting said mechanism along said guide structure, means mounting said guide structure for pivotal movement in a vertical plane so that said structure is pivoted from a first upper position wherein said mechanism engages one of said drive receiving elements to a second lower position wherein said mechanism is moved out of the path of movement of said train and its drive receiving elements, a second piston and cylinder assembly for controlling the pivotal movement of said guide structure, fluid supply means for delivering fluid to said piston and cylinder assemblies and including a plurality of valves and control means for controlling the operation of said valves, said control means including a first switch engaged by said mechanism when it is fully retracted along said guide structure, a second switch operated by said mechanism when it is fully extended along said guide structure, a third switch operated by said guide structure when it is in said first position and a fourth switch operated by said guide structure when the latter is in said second position, said fluid supply means and its switches and valves being effective automatically to operate said first and second piston and cylinder assemblies in sequence so that said first piston and cylinder assembly is effective with said structure in said first position and with said third switch operated to advance said mechanism along said guide structure until said second switch is engaged by said mechanism whereupon said second piston and cylinder assembly is rendered effective to pivot said guide structure to said second position to engage said fourth switch, thereby to render the first piston and cylinder assembly effective to retract said mechanism along said guide structure until said mechanism engages said first switch and renders said second piston and cylinder assembly effective to return said guide structure to said first position.

2. In combination, a mold conveying train having a series of equally spaced drive receiving elements thereon and drive means for advancing said train in step-by-step fashion by successively engaging said elements, said drive means comprising a guide structure extending generally parallel to the path of movement of the train, a mechanism engageable with said drive receiving elements and movable along said guide structure, a first piston and cylinder assembly mounted on said guide structure for advancing and retracting said mechanism along said guide structure, means mounting said guide structure for movement so that said structure is moved from a first position wherein said mechanism engages one of said drive receiving elements to a second position wherein said mechanism is moved out of the path of movement of said train and its drive receiving elements, a second piston and cylinder assembly for controlling the movement of said guide structure, fluid supply means for delivering fluid to said piston and cylinder assemblies and including a plurality of valves and control means for controlling the operation of said valves, said control means including a first switch engaged by said mechanism when it is fully retracted along said guide structure, a second switch operated by said mechanism when it is fully extended along said guide structure, a third switch operated by said guide structure when it is in said first position and a fourth switch operated by said guide structure when the latter is in said second position, said fluid supply means and its switches and valves being effective automatically to operate said first and second piston and cylinder assemblies in sequence so that with said structure in said first position and said third switch operated said first piston and cylinder assembly is effective to advance said mechanism along said guide structure until said second switch is engaged by said mechanism whereupon said second piston and cylinder assembly is rendered effective to move said guide structure to said second position to engage said fourth switch, thereby rendering the first piston and cylinder assembly effective to retract said mechanism along said guide structure until said mechanism engages said first switch and renders said second piston and cylinder assembly operative to return said guide structure to said first position.

3. The apparatus defined by claim 2 wherein said fluid supply means includes a cam operated valve for controlling the rate of movement of the piston in said first piston and cylinder assembly and wherein cam means are provided on said mechanism for operating the last named valve.

4. In combination, a mold conveying train having a series of equally spaced drive receiving elements thereon and drive means for advancing said train in step-by-step fashion by successively engaging said elements, said drive means comprising a guide structure extending beneath and generally parallel to the path of movement of the train, a mechanism engageable with said drive receiving elements and movable along said guide structure, a first piston and cylinder assembly mounted on said guide structure for advancing and retracting said mechanism along said guide structure, means mounting said guide structure for pivotal movement so that said structure is pivoted in a vertical plane from a first upper position wherein said mechanism engages one of said drive receiving elements to a second lower position wherein said mechanism is moved out of the path of movement of said train and its drive receiving elements, a second piston and cylinder assembly for controlling the pivotal movement of said guide structure, fluid supply means for delivering fluid to said piston and cylinder assemblies in sequence and including a plurality of valves and control means for controlling the operation of said valves, said control means including a first switch engaged by said mechanism when it is fully retracted along said guide structure, a second switch operated by said mechanism when it is fully extended along said guide structure, a third switch operated by said guide structure when it is in said first position and a fourth switch operated by said guide structure when the latter is in said second position, said fluid supply means and its switches and valves being effective to maintain the guide structure in said first position during the advancing movement of said mechanism in order to maintain the mechanism in engagement with one of said drive receiving elements and also being effective to maintain the guide structure in said second position during the retracting movement of said mechanism, thereby to disengage the mechanism from all of the drive receiving elements.

5. In combination, a mold conveying train having a series of equally spaced drive receiving elements thereon and drive means for advancing said train in step-by-step fashion by successively engaging said elements, said drive means comprising a guide structure extending generally parallel to the path of movement of the train, a mechanism engageable with said drive receiving elements and movable along said guide structure, a first piston and cylinder assembly mounted on said guide structure for advancing and retracting said mechanism along said guide structure, means mounting said guide structure for movement so that said structure is moved from a first position wherein said mechanism engages one of said drive receiving elements to a second position wherein said mechanism is moved out of the path of movement of said train and its drive receiving elements, a second piston and cylinder assembly for controlling the movement of said guide structure, fluid supply means for delivering fluid to said piston and cylinder assemblies in sequence and including a plurality of valves and control means for controlling the operation of said valves, said control means including a first switch engaged by said mechanism when it is fully retracted along said guide structure, a second switch operated by said mechanism when it is fully extended along said guide structure, a third switch operated by said guide structure when it is in said first position and a fourth switch operated by said guide structure when the latter is in said second position, said fluid supply means and its switches and valves being effective to maintain the guide structure in said first position during the advancing movement of said mechanism in order to maintain the mechanism in engagement with one of said drive receiving elements and also being effective to maintain the guide structure in said second position during the retracting movement of said mechanism, thereby to disengage the mechanism from all of the drive receiving elements.

6. The apparatus defined by claim 5 wherein said fluid supply means includes a cam operated valve for controlling the rate of movement of the piston in said first piston and cylinder assembly and wherein cam means are provided on said mechanism for operating the last named valve.

7. In combination, a mold conveying train having a series of equally spaced drive receiving elements thereon and drive means for advancing said train in step-by-step fashion by successively engaging said elements, said drive means comprising a guide structure extending generally parallel to the path of movement of the train, a mechanism engageable with said drive receiving elements and movable along said guide structure, a first piston and cylinder assembly on said guide structure having a stroke equal to the spacing between said drive receiving element for advancing and retracting said mechanism along said guide structure, means mounting said guide structure for movement so that said structure is moved from a first position wherein said mechanism engages one of said drive receiving elements to a second position wherein said mechanism is moved out of the path of movement of said train and its drive receiving elements, a second piston and cylinder assembly for controlling the movement of said guide structure, and means for automatically controlling the delivery of fluid to said assemblies in sequence so that the guide structure is maintained in said first position during the advancing movement of the mechanism and is maintained in said second position during the retracting movement of the mechanism.

8. The apparatus defined by claim 7 wherein said fluid supply means includes a cam operated valve for controlling the rate of movement of the piston in said first piston and cylinder assembly and wherein cam means are provided on said mechanism for operating the last named valve.

9. In combination, a mold conveying train having a series of equally spaced drive receiving elements thereon and drive means for advancing said train in step-by-step fashion by successively engaging said elements, said drive means comprising a guide structure extending beneath and generally parallel to the path of movement of the train, a mechanism engageable with said drive receiving elements and movable along said guide structure, a piston and cylinder assembly for advancing and retracting said mechanism along said guide structure, means mounting said guide structure for pivotal movement so that said structure is pivoted in a vertical plane from a first upper position wherein said mechanism engages one of said drive receiving elements to a second lower position wherein said mechanism is moved out of the path of movement of said train and its drive receiving elements, and means for correlating the movement of said guide structure and the operation of said piston and cylinder assembly so that the guide structure is maintained in said first position during the advancing movement of the mechanism and is maintained in said second position during the retracting movement of the mechanism.

10. In an apparatus for driving and indexing a mold conveyor train the combination train engaging means, guide structure extending beneath and generally parallel to the path of movement of the train and mounting said train engaging means for movement therealong, means mounting said guide structure for pivotal movement in a vertical plane, means for advancing said train engaging means along said guide structure in a first direction and for retracting said train engaging means in the opposite direction along said guide structure, means for pivoting said guide structure in correlation with the advancing and retracting means so that said structure is pivoted upwardly to maintain said engaging means in engagement with the train during the advancing movement of the engaging means along said guide structure and so that said structure is pivoted downwardly to move said engaging means out of engagement with said train during the retracting movement of the engaging means.

11. In an apparatus for driving and indexing a mold conveyor train the combination of train engaging means, means for moving said engaging means into and out of engagement with said train, means for advancing and retracting said train engaging means to advance said train in step-by-step manner, means for coordinating the operation of said moving means and said advancing and retracting means so that said engaging means engages said train throughout its advancing movement and is disengaged from said train during its retracting movement, and means responsive to the movement of said train engaging means for controlling the deceleration of the train engaging means at the completion of its advancing movement.

12. In an apparatus for driving and indexing a mold conveyor train the combination train engaging means, guide structure extending adjacent and generally parallel to the path of movement of the train and mounting said train engaging means for movement therealong, means mounting said guide structure for pivotal movement toward and away from said train, means for advancing said train engaging means along said guide structure in a first direction and for retracting said train engaging means in the opposite direction along said guide structure, and means for pivoting said guide structure in correlation with the advancing and retracting means so that said structure is pivoted toward the train to maintain said engaging means in engagement with the train during the advancing movement of the engaging means along said guide structure and so that said structure is pivoted away from the train to move said engaging means out of engagement with said train during the retracting movement of the engaging means.

References Cited in the file of this patent
UNITED STATES PATENTS

| | | |
|---|---|---|
| 1,832,343 | Wittman | Nov. 17, 1931 |
| 1,853,417 | Hall | Apr. 19, 1932 |
| 2,193,076 | Prible | Mar. 12, 1940 |
| 2,622,401 | Drago | Dec. 29, 1952 |
| 2,747,346 | Tigerman et al. | May 29, 1956 |